US012679486B2

(12) United States Patent
Seo et al.

(10) Patent No.: US 12,679,486 B2
(45) Date of Patent: Jul. 14, 2026

(54) ROBOT

(71) Applicants: IUCF-HYU (INDUSTRY-UNIVERSITY COOPERATION FOUNDATION HANYANG UNIVERSITY), Seoul (KR); KYONGGI UNIVERSITY INDUSTRY & ACADEMIA COOPERATION FOUNDATION, Suwon-si (KR)

(72) Inventors: Taewon Seo, Seoul (KR); Youngjoo Lee, Seoul (KR); Hwa Soo Kim, Yongin-si (KR); Garam Park, Seoul (KR); Jiseok Lee, Seoul (KR); Joohyun Oh, Seoul (KR); Doopyo Yoon, Seoul (KR); Hobyeong Chae, Seoul (KR); Myoungjae Seo, Seoul (KR)

(73) Assignees: IUCF-HYU (INDUSTRY-UNIVERSITY COOPERATION FOUNDATION HANYANG UNIVERSITY), Seoul (KR); KYONGGI UNIVERSITY INDUSTRY & ACADEMIA COOPERATION FOUNDATION, Suwon-si (KR)

( * ) Notice: Subject to any disclaimer, the term of this patent is extended or adjusted under 35 U.S.C. 154(b) by 749 days.

(21) Appl. No.: 17/924,867

(22) PCT Filed: May 12, 2021

(86) PCT No.: PCT/KR2021/005916
§ 371 (c)(1),
(2) Date: Nov. 11, 2022

(87) PCT Pub. No.: WO2021/230641
PCT Pub. Date: Nov. 18, 2021

(65) Prior Publication Data
US 2023/0227116 A1 Jul. 20, 2023

(30) Foreign Application Priority Data
May 12, 2020 (KR) ........................ 10-2020-0056340

(51) Int. Cl.
*B62D 57/02* (2006.01)
*B25J 5/00* (2006.01)
(Continued)

(52) U.S. Cl.
CPC .............. *B62D 57/022* (2013.01); *B25J 5/00* (2013.01); *B25J 9/00* (2013.01); *B25J 9/10* (2013.01); *F16H 1/222* (2013.01)

(58) Field of Classification Search
CPC ........ B62D 57/032; B62D 57/022; B25J 5/00; B25J 9/00; B25J 9/10; F16H 1/222; F16H 1/14
See application file for complete search history.

(56) References Cited

U.S. PATENT DOCUMENTS 3,269,478 A * 8/1966 Joslyn .................... A61G 5/068
280/5.2
3,411,599 A * 11/1968 Kahlmorgan ........... A47L 11/10
180/8.2
(Continued)

FOREIGN PATENT DOCUMENTS

CN 108674514 A 10/2018
JP 2004-249455 A 9/2004
(Continued)

OTHER PUBLICATIONS

International Search Report for PCT/KR2021/005916, dated Jul. 20, 2021.

*Primary Examiner* — Timothy Wilhelm
(74) *Attorney, Agent, or Firm* — Sughrue Mion, PLLC

(57)                    ABSTRACT

The present invention relates to a robot. A robot according to one embodiment of the present invention comprises a body having a set volume, and traveling members provided in the left area and right area of the body and rotatably connected to the body through rotating shafts, wherein the rotating shafts are positioned to be vertically inclined at the incline of the rotating shafts so that same gradually face outward from the top to the bottom thereof.

11 Claims, 6 Drawing Sheets

(51)  Int. Cl.
    *B25J 9/00*         (2006.01)
    *B25J 9/10*         (2006.01)
    *F16H 1/22*         (2006.01)

(56)                  References Cited

U.S. PATENT DOCUMENTS

| | | | | |
|---|---|---|---|---|
| 3,529,479 | A * | 9/1970 | Ryan | A63H 17/12 |
| | | | | 446/463 |
| 4,200,161 | A * | 4/1980 | Penington, Jr. | B62D 57/00 |
| | | | | 180/8.2 |
| 5,121,805 | A * | 6/1992 | Collie | B62D 57/024 |
| | | | | 446/469 |
| 5,127,484 | A * | 7/1992 | Bares | B62D 57/02 |
| | | | | 901/1 |
| 6,860,346 | B2 * | 3/2005 | Burt | B62D 57/028 |
| | | | | 180/218 |
| 6,964,309 | B2 * | 11/2005 | Quinn | B62D 57/022 |
| | | | | 180/8.5 |
| 7,249,640 | B2 * | 7/2007 | Horchler | B62D 57/022 |
| | | | | 180/8.5 |
| 7,380,618 | B2 * | 6/2008 | Gunderson | B62D 49/0635 |
| | | | | 180/7.1 |
| 7,503,567 | B2 * | 3/2009 | Frankie | A61G 5/061 |
| | | | | 280/5.2 |
| 7,543,663 | B2 * | 6/2009 | Setrakian | B62D 61/00 |
| | | | | 180/8.1 |
| 7,588,105 | B2 * | 9/2009 | Hillis | B62D 57/022 |
| | | | | 180/7.1 |
| 7,806,208 | B2 * | 10/2010 | Gunderson | B62D 57/022 |
| | | | | 180/7.1 |
| 7,878,276 | B2 * | 2/2011 | Limbacher, Jr. | B62D 57/024 |
| | | | | 180/8.5 |
| 8,380,351 | B2 * | 2/2013 | Okuda | F16H 1/16 |
| | | | | 700/275 |
| 9,010,105 | B1 * | 4/2015 | Bennett | B60K 25/00 |
| | | | | 60/486 |
| 9,308,968 | B2 * | 4/2016 | Kwon | B62M 29/02 |
| 9,377,083 | B2 * | 6/2016 | Chung | F16H 37/065 |
| 9,757,978 | B1 * | 9/2017 | Emigh | B60B 9/28 |
| 9,878,576 | B2 * | 1/2018 | Hein | B60B 19/04 |
| 9,989,970 | B1 * | 6/2018 | Morey | B62D 57/024 |
| 10,124,483 | B1 * | 11/2018 | Cotton | H02K 7/1876 |
| 10,421,510 | B2 * | 9/2019 | Aramayo, II | B62D 57/028 |
| 2002/0179342 | A1 * | 12/2002 | Quinn | B62D 57/022 |
| | | | | 180/8.1 |
| 2003/0188597 | A1 * | 10/2003 | Kor | F16M 11/18 |
| | | | | 74/490.01 |
| 2012/0059520 | A1 * | 3/2012 | Kossett | B60B 15/02 |
| | | | | 180/65.6 |
| 2016/0001831 | A1 * | 1/2016 | Cotton | B62D 57/022 |
| | | | | 901/1 |

FOREIGN PATENT DOCUMENTS

| | | | | |
|---|---|---|---|---|
| KR | 10-2010-0037292 | A | | 4/2010 |
| KR | 10-1057469 | B1 | | 8/2011 |
| KR | 10-1211786 | B1 | | 12/2012 |
| KR | 101361491 | B1 | * | 2/2014 |
| KR | 10-2018-0067604 | A | | 6/2018 |
| WO | WO-2017065649 | A1 | * | 4/2017        A61G 5/06 |

* cited by examiner $$\alpha + \beta = 90$$

$\alpha > \beta$ $\alpha < \beta$ $\alpha + \beta > 90$

α = β

α = β = 90

ROBOT

CROSS REFERENCE TO RELATED APPLICATIONS

This application is a National Stage of International Application No. PCT/KR2021/005916 filed May 12, 2021, claiming priority based on Korean Patent Application No. 10-2020-0056340 filed May 12, 2020.

TECHNICAL FIELD

The present invention relates to a robot, and more specifically, to a robot that prevents interference between a traveling member and a body during traveling and prevents foreign substances from splashing to the body.

BACKGROUND ART

A robot is generally configured to include a body and wheels or wheel-like structures rotatably positioned on left and right sides of the body. Accordingly, the robot moves on a ground according to the rotation of the wheels. An obstacle protruding from a plane may appear on the ground where the robot moves. In order for the robot to move over the obstacle through the wheels, it is required that a rotating shaft of the wheel is sufficiently higher than an upper end of the obstacle. Accordingly, a radius of the wheel with respect to the rotating shaft increases. In this case, a height of an upper end of the wheel also increases. Since it is necessary to prevent interference from occurring between the upper end of the wheel and the body, a structural design of the body is restricted when the height of the upper end of the wheel increases. In addition, as the height of the upper end of the wheel increases, foreign substances on an outer surface of the wheel are splashed toward the body during rotation of the wheel. Devices such as cameras may be attached to the body depending on a purpose of the robot, and foreign substances splashed to the body causes deterioration of a robot's performance.

DISCLOSURE

Technical Problem

The present invention is to provide a robot which can efficiently travel.

In addition, the present invention is to provide a robot which can prevent occurrence of interference between traveling members and a body when the traveling members rotate.

In addition, the present invention is to provide a robot which can prevent foreign substances from splashing from the traveling members to the body when the traveling members rotate.

In addition, the present invention is to provide a robot which can efficiently transmit power to the traveling members.

Technical Solution

According to one aspect of the present invention, there may be provided a robot including: a body having a set volume; and traveling members provided at left and right regions of the body, respectively, and rotatably connected to the body by rotating shafts, wherein the rotating shafts are positioned to be vertically inclined at a rotating shaft inclination such that the rotating shaft is gradually directed outward from a top to a bottom thereof.

In addition, the rotating shaft may be positioned on a plane including a vertical direction and a left-right direction.

In addition, the traveling member may include a plurality of legs having upper end portions connected to the rotating shaft.

In addition, the traveling module may include at least three legs.

In addition, a longitudinal direction of the leg may be provided to be inclined by a leg inclination with respect to a longitudinal direction of the rotating shaft.

In addition, a sum of the rotating shaft inclination and the leg inclination may be less than or equal to 90°.

In addition, the rotating shaft inclination may be configured to be greater than or equal to the leg inclination.

In addition, the rotating shaft inclination may be identical to the leg inclination.

In addition, the rotating shaft inclination and the leg inclination may be set to 45°.

In addition, a plurality of traveling members may be provided while being spaced apart from each other by a set distance in a front-rear direction.

In addition, the robot may further include: a driving shaft positioned inside the body so that a longitudinal direction of the driving shaft is directed to a front-rear direction of the body; and a driving member providing power for rotating the driving shaft, wherein the driving shaft includes: a first driving shaft positioned at the left region inside the body; and a second driving shaft positioned at the right region inside the body, and wherein the first driving shaft and the second driving shaft are connected to a plurality of rotating shafts spaced apart from each other in the front-rear direction to rotate the rotating shafts according to rotation thereof.

In addition, the robot may further include a power transmission portion configured to transmit the power of the driving member to the first driving shaft and the second driving shaft.

In addition, the power transmission portion may include: a driving gear connected to the driving member; a first driven gear connected to the first driving shaft; and a second driven gear connected to the second driving shaft.

In addition, the robot may further include switching gears positioned between the driving gear and the first driven gear or between the driving gear and the second driven gear such that a number of switching gears positioned between the driving gear and the first driven gear is different from a number of switching gears positioned between the driving gear and the second driven gear.

In addition, the robot may further include bevel gears provided on the driving shaft and the rotating shaft, respectively, to connect the driving shaft and the rotating shaft.

Advantageous Effects

According to one embodiment of the present invention, it is possible to provide a robot which can efficiently travel.

In addition, according to one embodiment of the present invention, it is possible to provide a robot which can prevent occurrence of interference between traveling members and a body when the traveling members rotate.

In addition, according to the present invention, it is possible to provide a robot which can prevent foreign substances from splashing from the traveling members to the body when the traveling members rotate.

In addition, according to an embodiment of the present invention, it is possible to provide a robot which can efficiently transmit power to the traveling members.

BEST MODE FOR INVENTION

Figure 1:
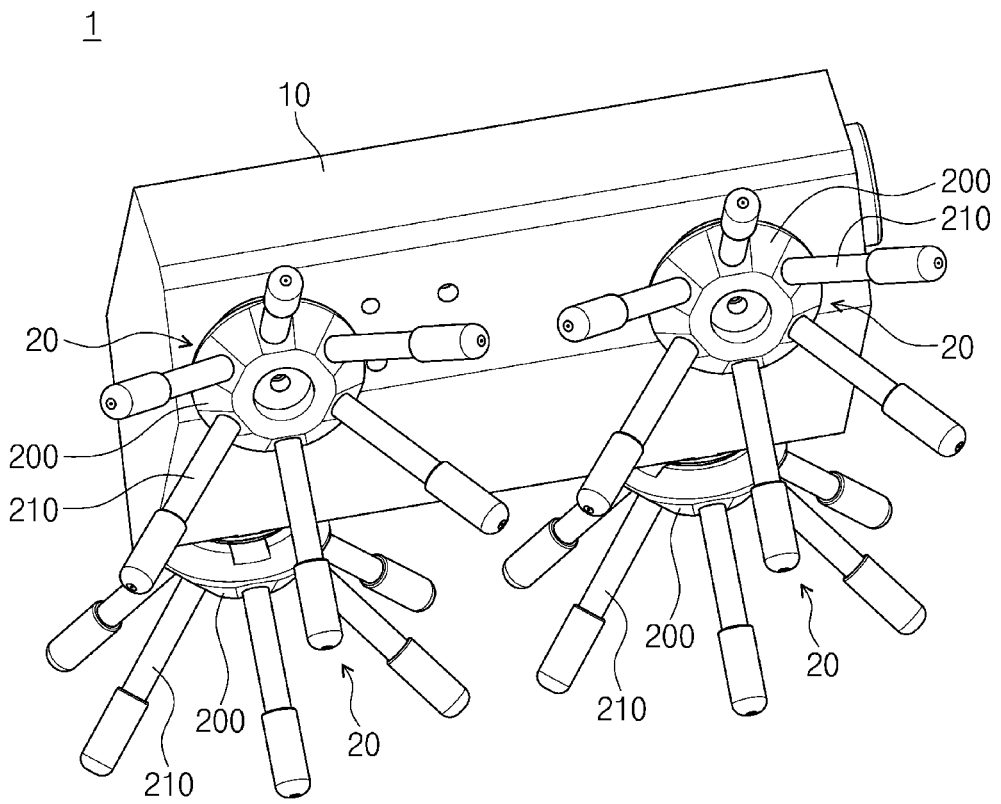
FIG. 1 is a view showing a robot according to one embodiment of the present invention.

A robot according to one embodiment of the present invention includes: a body having a set volume; and traveling members provided at left and right regions of the body, respectively, and rotatably connected to the body by rotating shafts, wherein the rotating shafts are positioned to be vertically inclined at a rotating shaft inclination such that the rotating shaft is gradually directed outward from a top to a bottom thereof.

MODE FOR INVENTION

Hereinafter, preferred embodiments of the present invention will be described in detail with reference to the accompanying drawings. However, the present invention may be embodied in different forms and should not be construed as limited to the embodiments set forth herein. Rather, the embodiments are provided so that this disclosure will be thorough and complete, and will fully convey the scope of the present invention to those skilled in the art.

In the present specification, it will be understood that when an element is referred to as being "on" another element, it can be formed directly on the other element or intervening elements may be present. In the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Embodiments explained and illustrated herein include their complementary counterparts. As used herein, the term "and/or" includes any and all combinations of one or more of the associated listed elements.

The singular expression also includes the plural meaning as long as it does not differently mean in the context. In addition, the terms "comprise", "have" etc., of the description are used to indicate that there are features, numbers, steps, elements, or combinations thereof, and they should not exclude the possibilities of combination or addition of one or more features, numbers, operations, elements, or a combination thereof. Furthermore, it will be understood that when an element is referred to as being "connected" or "coupled" to another element, it may be directly connected or coupled to the other element or intervening elements may be present.

In addition, when detailed descriptions of related known functions or constitutions are considered to unnecessarily cloud the gist of the present invention in describing the present invention below, the detailed descriptions will not be included.

FIG. 1 is a view showing a robot according to one embodiment of the present invention.

Referring to FIG. 1, a robot 1 includes a body 10 and traveling members 20.

Hereinafter, directions in which the traveling members 20 are positioned with respect to the body 10 are referred to as a left direction and a right direction, respectively, a direction perpendicular to the left-right direction with respect to a plane on which the robot 1 is positioned is referred to as a front-rear direction, and a direction perpendicular to the left-right direction and the front-rear direction is referred to as a vertical direction.

The body 10 is configured to have a set volume.

The traveling members 20 are provided at left and right regions of the body 10, respectively, to allow the robot 1 to travel on a ground according to rotation thereof. A plurality of traveling members 20 may be provided on left and right sides while being spaced apart from each other at a set distance in a front-rear direction. FIG. 1 illustrates a case in which two traveling members 20 are provided on the left and right sides.

Figure 2:
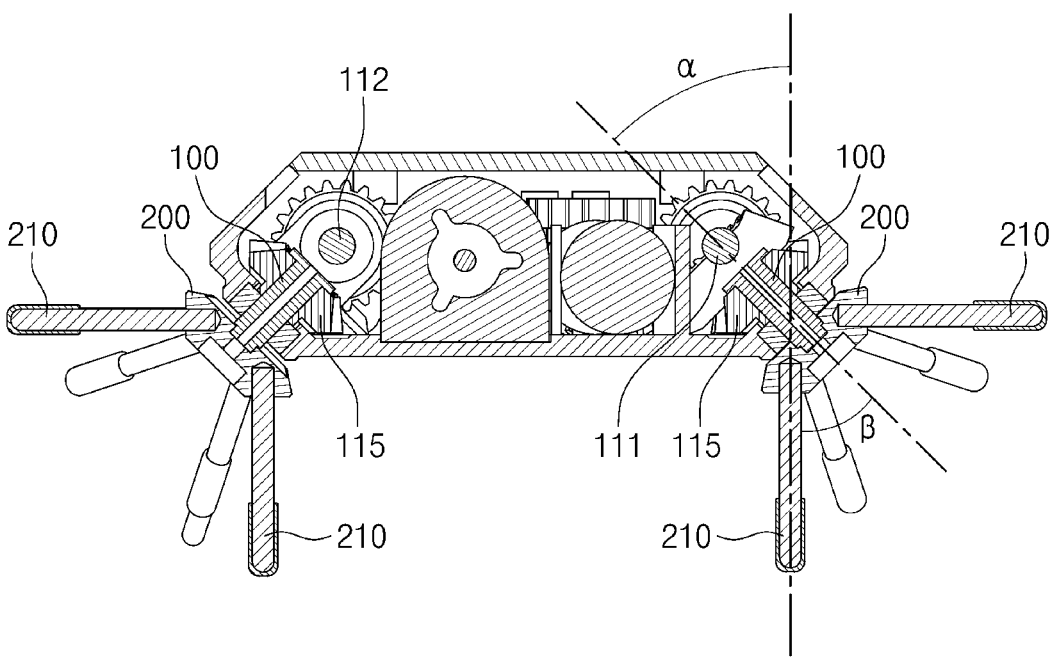
FIG. 2 is a longitudinal sectional view of a robot in a left-right direction.
Figure 3:
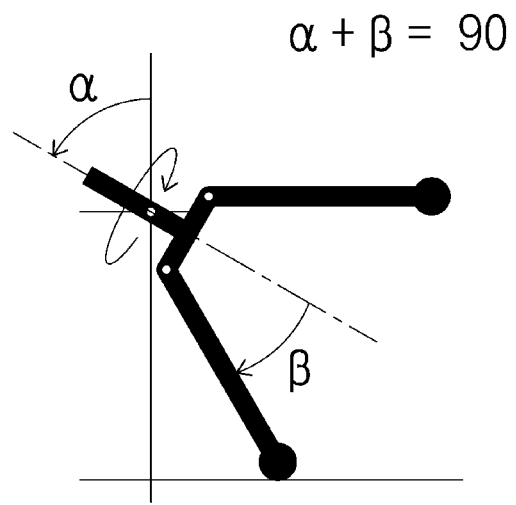
FIGS. 3 to 8 are views explaining directions of a rotating shaft and a leg according to a rotating shaft inclination and a leg inclination.
Figure 4:
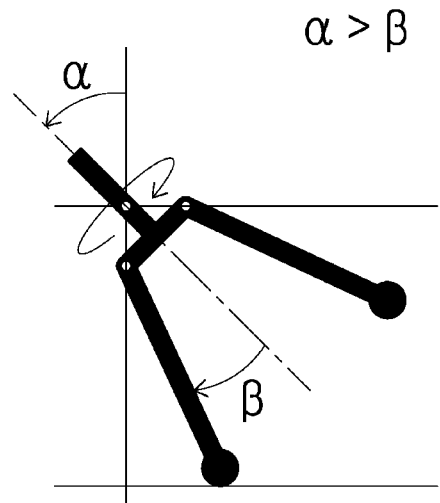
Figure 5:
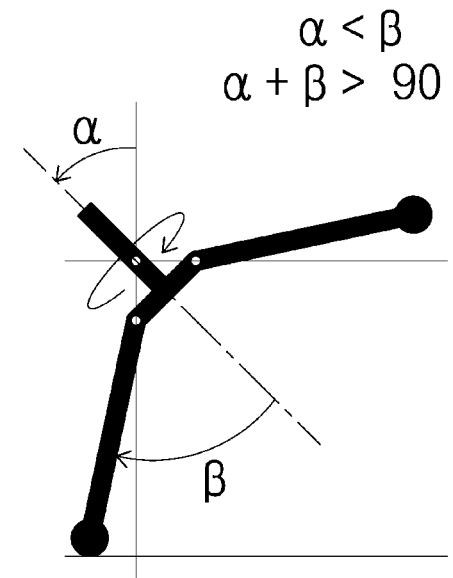
Figure 6:
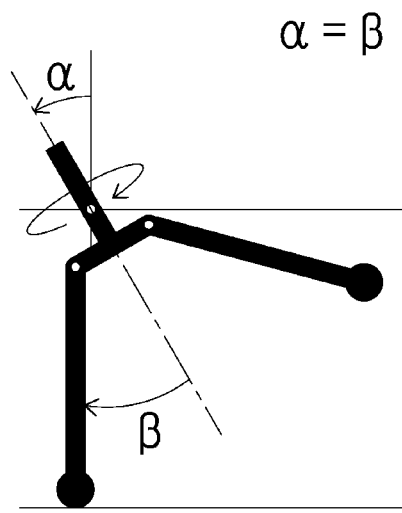
Figure 7:
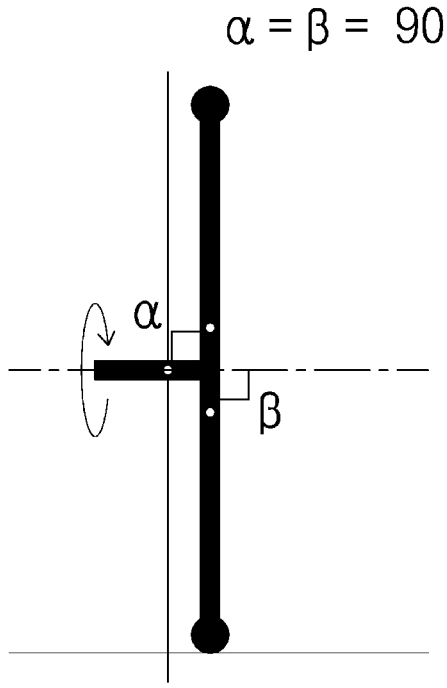
Figure 8:
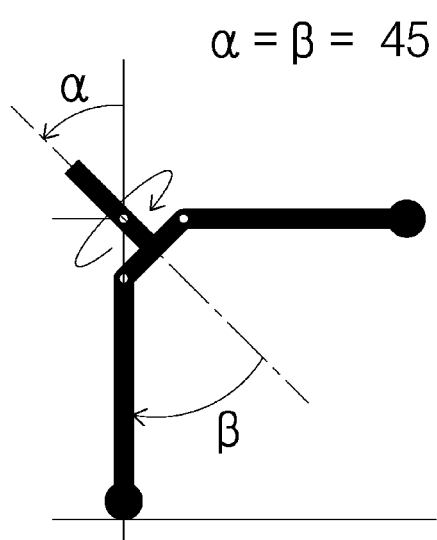

FIG. 2 is a longitudinal sectional view of the robot in a left-right direction.

Referring to FIG. 2, rotating shafts 100 are provided at lower portions of the body 10, and the traveling members 20 are connected to the rotating shafts 100. The rotating shaft 100 is positioned on a plane including a vertical direction and the left-right direction. The rotating shaft 100 is positioned to be vertically inclined at a rotating shaft inclination $\alpha$ such that the rotating shaft is gradually directed outward from a top and a bottom thereof. The rotating shaft inclination $\alpha$ is an acute angle.

The traveling member 20 includes a plurality of legs 210. The traveling member 20 includes at least three legs 210. FIG. 1 illustrates a case in which the traveling member 20 includes six legs 210. The leg 210 has a set length and an upper end portion thereof is connected to the rotating shaft 100, and is provided to be rotated together with the rotating shaft 100 according to rotation of the rotating shaft 100. For example, a rotating plate 200 having a set area may be coupled to a lower end portion of the rotating shaft 100, and an upper end portion of the leg 210 may be provided to be coupled to the rotating plate 200. In addition, the upper end portion of the leg 210 may be directly connected to the lower end portion of the rotating shaft 100 without the rotating plate 200. A lower surface of the outer portion of the body 10 facing the traveling member 20 may be configured to be inclined upward at a set angle in the outward direction. Accordingly, the lower portion of the outer surface of the body 10 may be provided perpendicular to a longitudinal direction of the rotating shaft 100.

A longitudinal direction of the leg 210 is provided to be inclined by a leg inclination $\beta$ with respect to the longitudinal direction of the rotating shaft 100. The leg inclination $\beta$ is an acute angle. Accordingly, the plurality of legs 210 are positioned at a region corresponding to a motion of a cone using the longitudinal direction of the rotating shaft 100 as an axis, and lower ends of the plurality of legs 210 are positioned on a plane perpendicular to the rotating shaft 100. The plurality of legs 210 may be arranged at equal intervals. Thus, when the plurality of legs 210 are reflected on the plane perpendicular to the rotating shaft 100, central angles between adjacent legs 210 are identical to each other. For example, when the traveling member 20 includes six legs 210, a central angle between the legs 210 reflected on the plane perpendicular to the rotating shaft 100 may be 60°.

FIGS. 3 to 8 are views explaining directions of a rotating shaft and a leg according to a rotating shaft inclination and a leg inclination.

A sum of the rotating shaft inclination α and the leg inclination β is less than or equal to 90°. The legs 210 rotate on a conical-like trajectory according to the rotation of the rotating shaft 100. In this case, when the sum of the rotating shaft inclination α and the leg inclination β is less than or equal to 90°, the cone-like trajectory is positioned at a region below a horizontal plane (hereinafter, a reference plane) passing a top of the cone-like trajectory. Accordingly, the legs 210 are always positioned below the reference plane during traveling of the robot 1, such that occurrence of interference between the leg 210 and structures (for example, cameras), which are additionally installed on the body 10, is prevented, if necessary. In addition, the legs 210 always rotate on the trajectory below the reference plane, such that dust, moisture, etc. attached to the leg 210 is prevented from scattering above the reference plane during the traveling of the robot 1.

As another condition, the rotating shaft inclination α may be configured to be greater than or equal to the leg inclination β. When the leg inclination β is greater than the rotating shaft inclination α, the trajectory of the leg 210 is located below a central region of the body 10 with respect to the vertical direction. In this case, traveling stability is lowered due to the relationship between the interference between the traveling members 20 positioned on left and right sides and the center of gravity of the legs 210 in contact with the ground. Accordingly, the rotating shaft inclination α is preferred to be greater than or equal to the leg inclination β. More preferably, the rotating shaft inclination α may be identical to the leg inclination β. In this case, the trajectory of the leg 210 includes a direction provided in the vertical direction. Accordingly, the legs 210 rotate in a direction perpendicular to the horizontal plane, and a lowermost leg 210 is positioned perpendicular to the ground, such that the traveling stability of the robot 1 may be improved.

In addition, in order to satisfy both of the two conditions described above, the sum of the rotating shaft inclination α and the leg inclination β may be 90°. Accordingly, when the rotating shaft inclination α is 45°, the leg inclination β may be 45°.

Each of the traveling members 20 may be provided with a structure in which the rotating shaft inclination α is the same as the leg inclination β. The traveling member 20 positioned in the left-right direction may be provided so that positions of the legs 210 are symmetrical with respect to a plane including the vertical direction and the front-rear direction. In addition, the traveling members 20 arranged in the front-rear direction may be provided so that the positions of the legs 210 are the same. Accordingly, the plurality of traveling members 20 may be provided so that the positions of the lowermost legs 210 are the same in the front-rear direction and symmetrical to each other in the left-right direction.

Figure 9:
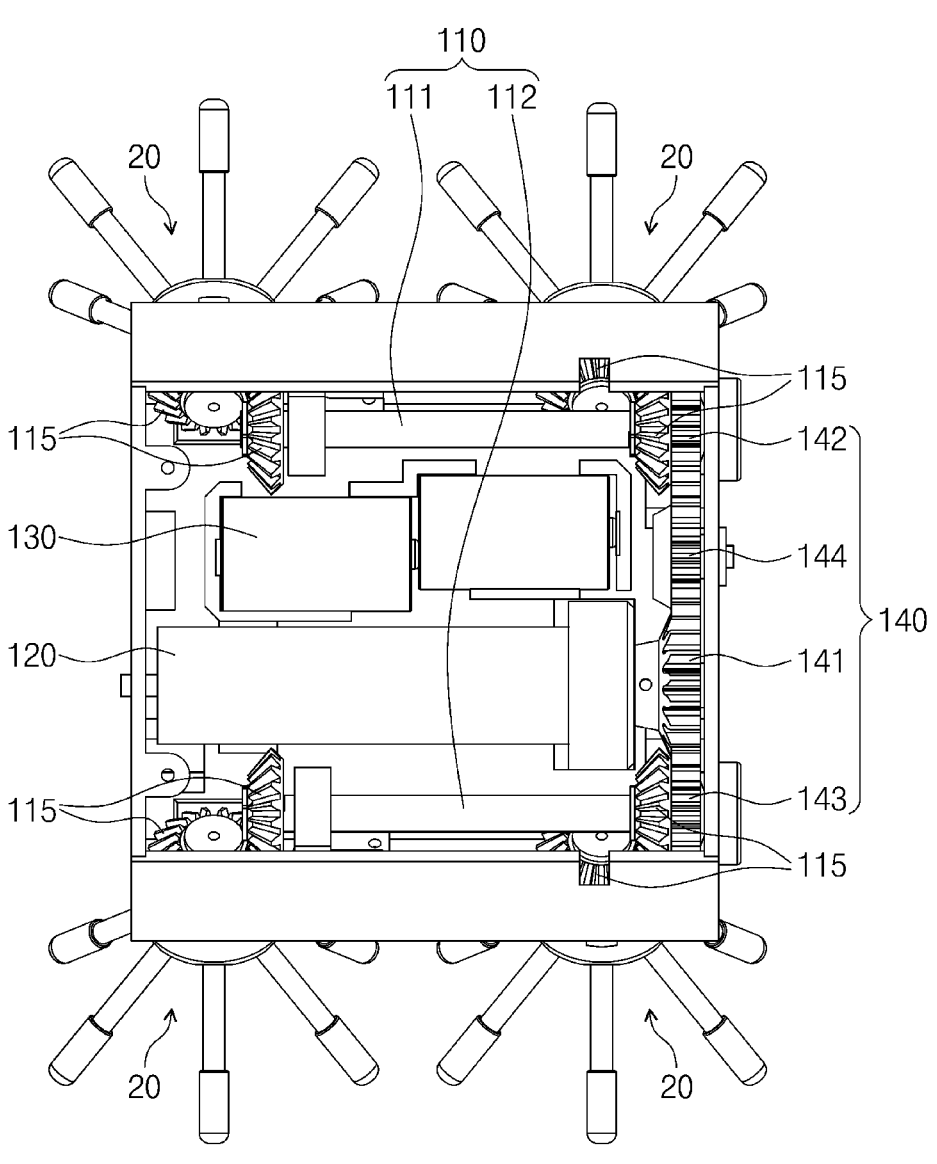
FIG. 9 is a view showing an inside of the body of FIG. 1.

FIG. 9 is a view showing an inside of the body of FIG. 1.

Referring to FIG. 9, a driving shaft 110, a driving member 120, and a power transmission portion 140 are provided inside the body 10.

The driving shaft 110 is configured so that a longitudinal direction thereof is the front-rear direction. The driving shaft 110 includes a first driving shaft 111 and a second driving shaft 112. The first driving shaft 111 is positioned at the left region inside the body 10. The second driving shaft 112 is positioned at the right region inside the body 10. The driving shaft 110 may be positioned adjacent to the upper ends of the plurality of rotating shafts 100 spaced apart from each other at a set distance in the front-rear direction, and the driving shaft 110 and the rotating shaft 100 may be connected to each other by a driving connection member 115. Accordingly, when the driving shaft 110 rotates, the rotating shafts 100 arranged to be spaced apart from each other in the front-rear direction rotate to operate the traveling members 20. For example, the driving connection member 115 may be a bevel gear provided to each of the driving shaft 110 and the rotating shaft 100.

The driving member 120 provides power for rotating the driving shaft 110. For example, the driving member 120 may be provided as a motor, and a power source 130 connected to the driving member 120 to provide the power to the driving member 120 may be positioned on one inner side of the body 10.

The power transmission portion 140 transmits the power of the driving member 120 to the driving shaft 110. The power transmission portion 140 includes a driving gear 141, driven gears 142 and 143, and a switching gear 144.

The driving gear 141 is connected to the driving member 120 and rotatably provided by the driving member 120.

The driven gears 142 and 143 are positioned at one point in the longitudinal direction of the driving shaft 110. For example, the driven gears 142 and 143 may be positioned on one end of the driving shaft 110 or positioned in a section between both ends of the driving shaft 110. FIG. 9 illustrates a case in which the driven gears 142 and 143 are positioned on a front end in the longitudinal direction of the driving shaft 110. The driven gears 142 and 143 rotate in engagement with the driving gear 141 to rotate the driving shaft 110. The driven gears 142 and 143 include a first driven gear 142 and a second driven gear 143. The first driven gear 142 is connected to the first driving shaft 111. The second driven gear 143 is connected to the second driving shaft 112.

The switching gear 144 is positioned between the driving gear 141 and the driven gears 142 and 143 to adjust rotation directions of the driven gears 142 and 143 with respect to a rotation direction of the driving gear 141. The switching gear that the number of switching gears 144 is provided such positioned between the driving gear 141 and the first driven gear 142 is different from the number of switching gears positioned between the driving gear 141 and the second driven gear 141. Therefore, when the driving gear 141 rotates, the first driven gear 142 and the second driven gear 143 rotate in a direction opposite to each other. Accordingly, the first driving shaft 111 and the second driving shaft 112 rotate in a direction opposite to each other, the traveling member 20 positioned on the left side and the traveling member 20 positioned on the right side rotate in symmetrical with respect to the plane including the front-rear direction and the vertical direction. For example, the switching gear 144 is provided either between the driving gear 141 and the first driven gear 142 or between the driving gear 141 and the second driven gear 143.

Through the above-described structure of the robot 1 according to one embodiment of the present invention, the first driving shaft 111 positioned on the left side and the second driving shaft 112 positioned on the right side rotate in the direction opposite to each other by one driving member 120. Further, the plurality of the traveling members 20 positioned on the left side rotates by one first driving shaft 111, and the plurality of traveling members 20 positioned on the right side rotates by one second driving shaft 112. In this case, the traveling member 20 positioned on the left side and the traveling member 20 positioned on the right side are operated in symmetrical with respect to the plane including the front-rear direction and the vertical direction.

While the present invention has been described in connection with the embodiments, it is not to be limited thereto but will be defined by the appended claims. In addition, it is to be understood that those skilled in the art can substitute, change or modify the embodiments in various forms without departing from the scope and spirit of the present invention.

INDUSTRIAL APPLICABILITY

The robot according to the present invention can be used to explore narrow and small spaces that are inaccessible to people.

The invention claimed is:

1. A robot comprising:

a body having a set volume; and traveling members provided at left and right regions of the body, respectively, and rotatably connected to the body by rotating shafts;

a driving shaft positioned inside the body so that a longitudinal direction of the driving shaft is directed to a front-rear direction of the body; and a driving member providing power for rotating the driving shaft, wherein the rotating shafts are positioned to be vertically inclined at a rotating shaft inclination such that the rotating shafts are gradually directed outward from a top to a bottom thereof, wherein the driving shaft comprises:

a first driving shaft positioned at a left region inside the body; and a second driving shaft positioned at a right region inside the body, wherein the first driving shaft and the second driving shaft are connected to a plurality of rotating shafts spaced apart from each other in the front-rear direction to rotate the rotating shafts according to rotation thereof, wherein the robot further comprises a power transmission portion configured to transmit the power of the driving member to the first driving shaft and the second driving shaft, the power transmission portion comprising:

a driving gear connected to the driving member;

a first driven gear connected to the first driving shaft; and a second driven gear connected to the second driving shaft, and wherein the robot further comprises switching gears positioned between the driving gear and the first driven gear or between the driving gear and the second driven gear such that a number of switching gears positioned between the driving gear and the first driven gear is different from a number of switching gears positioned between the driving gear and the second driven gear.

2. The robot of claim 1, wherein at least one of the rotating shafts is positioned on a plane including a vertical direction and a left-right direction.

3. The robot of claim 1, wherein at least one of the traveling members includes a plurality of legs having upper end portions connected to a rotating shaft from among the plurality of rotating shafts.

4. The robot of claim 3, wherein the at least one of the traveling members includes at least three legs.

5. The robot of claim 3, wherein a longitudinal direction of a leg from among the plurality of legs is provided to be inclined by a leg inclination with respect to a longitudinal direction of the rotating shaft.

6. The robot of claim 5, wherein a sum of the rotating shaft inclination and the leg inclination is less than or equal to 90°.

7. The robot of claim 5, wherein the rotating shaft inclination is configured to be greater than or equal to the leg inclination.

8. The robot of claim 5, wherein the rotating shaft inclination is identical to the leg inclination.

9. The robot of claim 5, wherein the rotating shaft inclination and the leg inclination are set to 45°.

10. The robot of claim 1, wherein at least two of the traveling members are spaced apart from each other by a set distance in the front-rear direction.

11. The robot of claim 1, further comprising bevel gears provided on the driving shaft and a rotating shaft, from among the plurality of rotating shafts, respectively, to connect the driving shaft and the rotating shaft.

* * * * *